(12) United States Patent
Nobuyasu et al.

(10) Patent No.: US 6,597,673 B1
(45) Date of Patent: Jul. 22, 2003

(54) CDMA SOFT HANDOFF CONTROL METHOD

(75) Inventors: Kosuke Nobuyasu, Kawasaki (JP); Atsushi Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/098,227

(22) Filed: Jun. 16, 1998

(30) Foreign Application Priority Data

Jan. 22, 1998 (JP) .......................................... 10-010376

(51) Int. Cl.⁷ .......................... H04Q 7/00; H04Q 7/20; H04B 7/216
(52) U.S. Cl. ........................ 370/331; 370/335; 455/442
(58) Field of Search ................................ 370/331, 443, 370/328, 335; 455/442

(56) References Cited

U.S. PATENT DOCUMENTS 5,959,981 A * 9/1999 Bruckert et al. ............ 370/331
6,151,502 A * 11/2000 Padovani et al. ............ 455/442

FOREIGN PATENT DOCUMENTS

WO 9107020 5/1991

OTHER PUBLICATIONS

Cho et al. Analysis of soft handoff rate in DS–CDMA cellular systems, 1997, IEEE, p. 235–238.*

* cited by examiner

*Primary Examiner*—Dang Ton
*Assistant Examiner*—Ronald Abelson
(74) *Attorney, Agent, or Firm*—Katten Muchin Zavis Rosenman

(57) ABSTRACT

Disclosed is a soft handoff control method in a CDMA mobile telecommunications system in which, when a mobile station is handed of to a wireless link with another base station, handoff to a prescribed wireless link is performed after wireless links are established between the mobile station and a plurality of base stations simultaneously. The method includes deciding, on the basis of the soft handoff rate of a base station, the number of soft handoff branches allocated to a mobile station residing in a cell that corresponds to the base station, and performing soft handoff based upon the number of soft handoff branches.

2 Claims, 13 Drawing Sheets

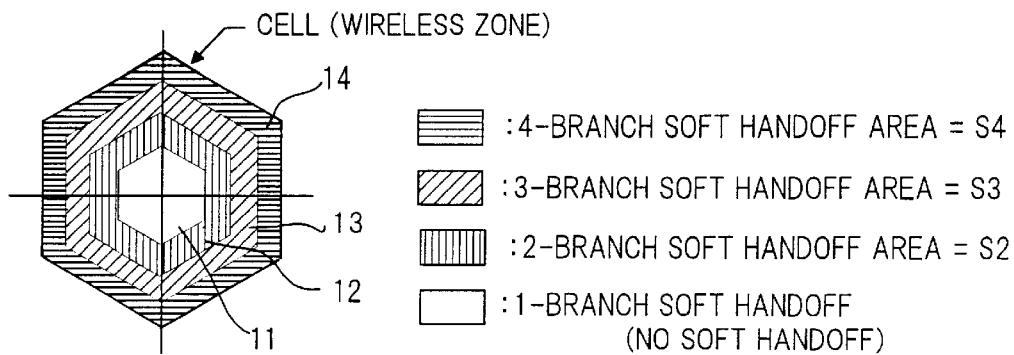

FIG. 1A

WHEN MAXIMUM NUMBER Nc OF SOFT HANDOFF BRANCHES IS FOUR AND THERE ARE FOUR AREAS IN WHICH SOFT HANDOFF BRANCHES HAVE BEEN DECIDED

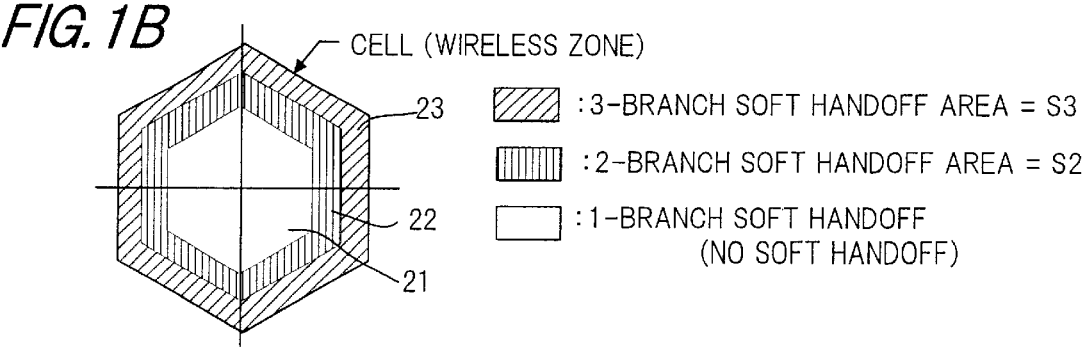

FIG. 1B

WHEN MAXIMUM NUMBER Nc OF SOFT HANDOFF BRANCHES IS THREE AND THERE ARE THREE AREAS IN WHICH SOFT HANDOFF BRANCHES HAVE BEEN DECIDED

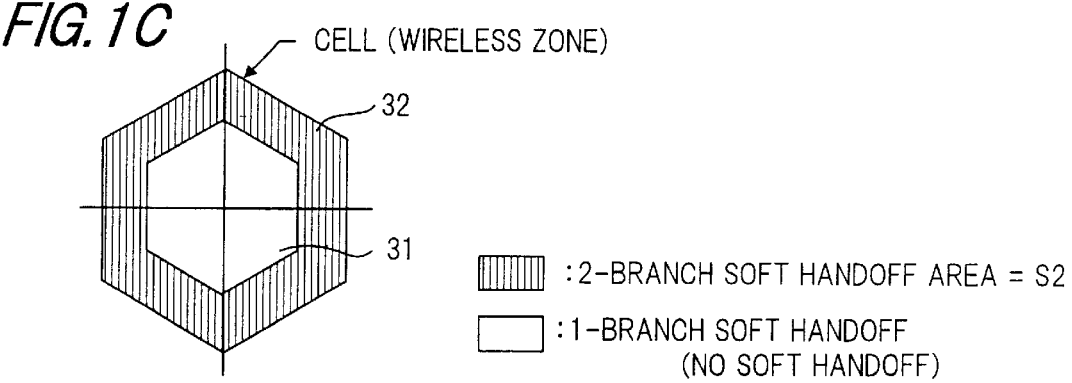

FIG. 1C

WHEN MAXIMUM NUMBER Nc OF SOFT HANDOFF BRANCHES IS TWO AND THERE ARE TWO AREAS IN WHICH SOFT HANDOFF BRANCHES HAVE BEEN DECIDED

FIG.5

| SOFT HANDOFF RATE | 0%~300% |
|---|---|
| AREA RATIO | CENTRALIZED (AREA RATIO = 1 : 0 : 0) : NUMBER OF SOFT HANDOFFS EQUAL TO Nc IN CELL PERIMETER AREA AND EQUAL TO ONE IN CENTER AREA<br>AREA RATIO = 1 : 1 : 1    AREA RATIO = 1 : 2 : 4 |
| MAXIMUM NUMBER OF SOFT HANDOFF BRANCHES | Nc = 1, 2, 3, 4 |
| TRANSMISSION CONDITIONS | DISTANCE ATTENUATION : $\alpha = 3.5$<br>STANDARD DEVIATION OF SHADOWING FLUCTUATION: $\sigma_{STM} = 8dB$<br>SHADOWING CORRELATION: $\rho = 0.5$<br>STANDARD DEVIATION OF TPC FLUCTUATION: $\sigma_{TPC} = 1.5dB$<br>Eb/No THRESHOLD VALUE: Eb/No−th = 5dB |

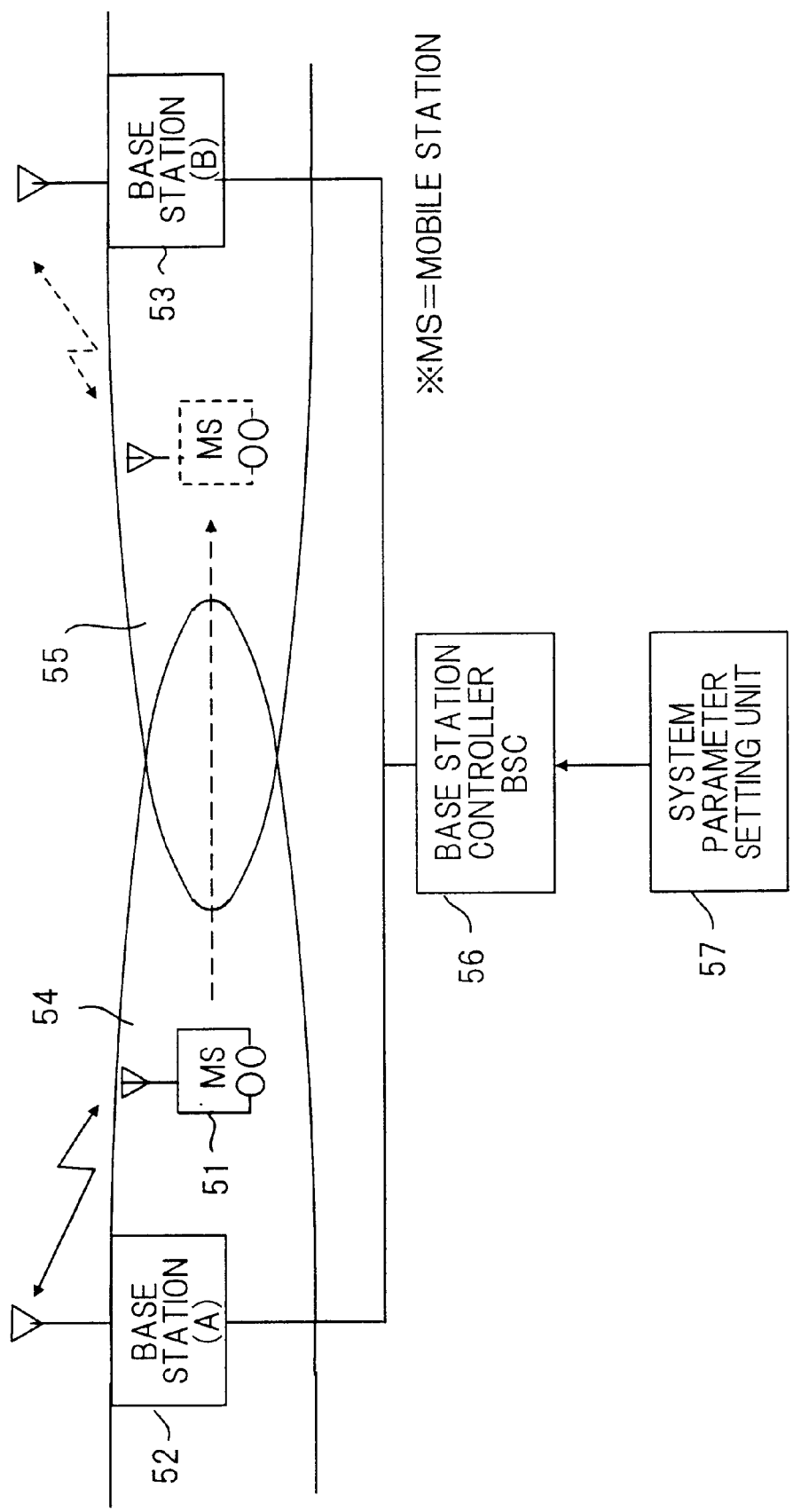

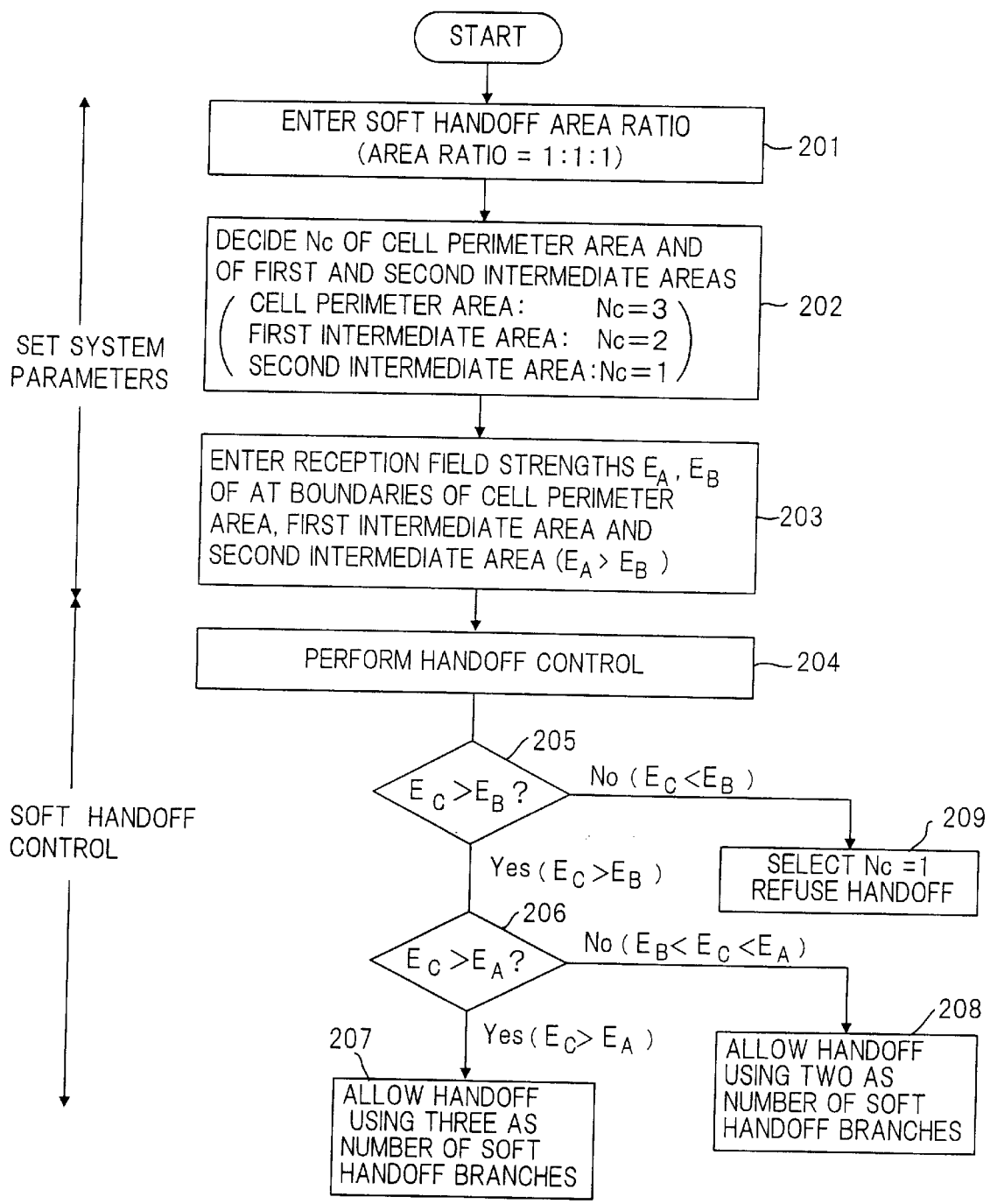

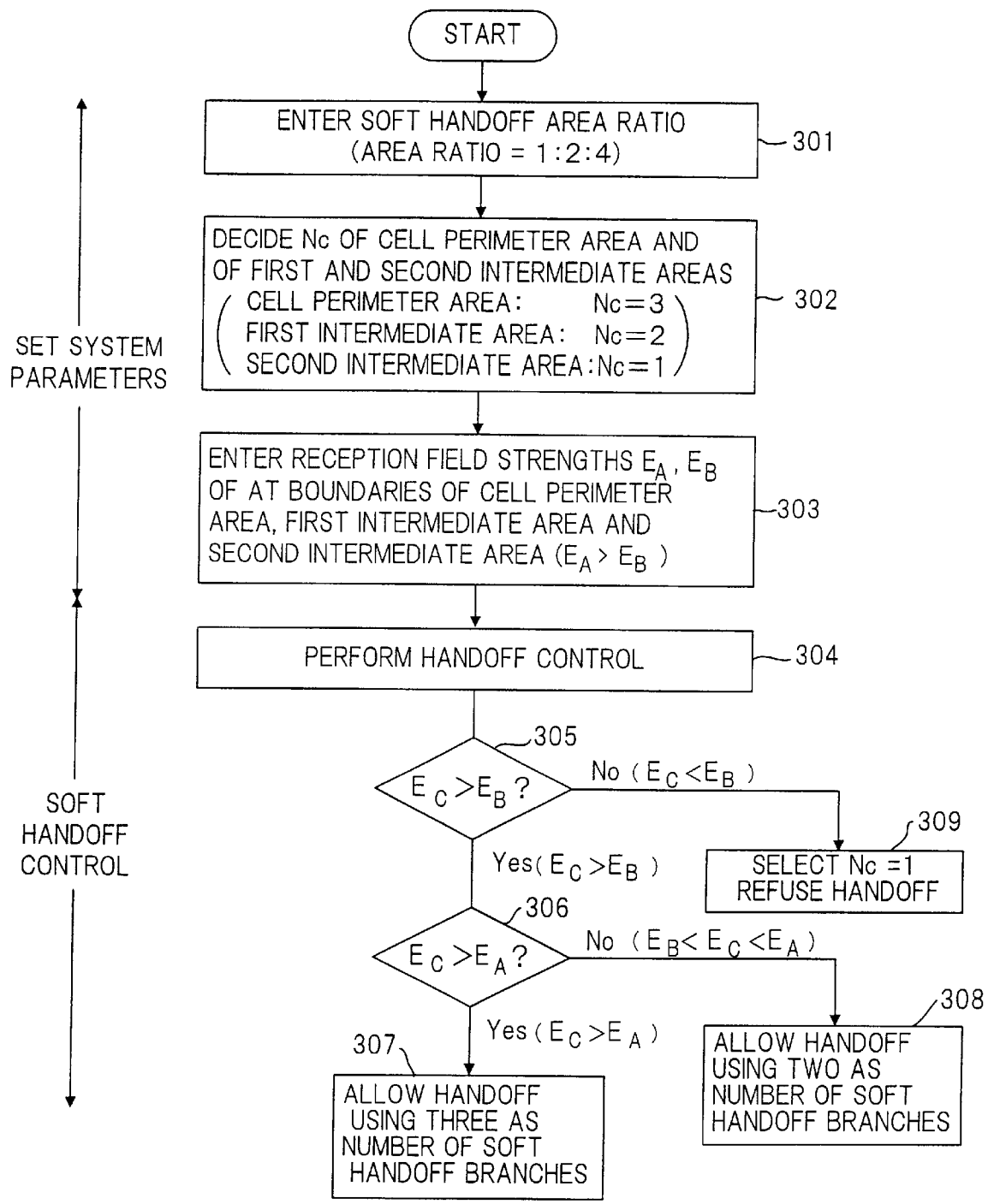

CDMA SOFT HANDOFF CONTROL METHOD

BACKGROUND OF THE INVENTION

This invention relates to a wireless link changeover control method (handoff control method) carried out when a mobile station (a car telephone, a portable telephone, etc.) moves from one cell to another cell. More particularly, the invention relates to a CDMA (Code Division Multiple Access) soft handoff control method.

In a cellular mobile telecommunications system, control for changing over a wireless link when a mobile station (a car telephone, a portable telephone, etc.) moves from one cell to another cell is referred to as "handoff". One method of such handoff control is soft handoff.

According to ordinary handoff (referred to as "hard" handoff as opposed to "soft" handoff), the wireless link between the mobile station and a base station in a first cell is severed at the time of handoff, after which a wireless link is established between the mobile station and a base station in a second cell. By contrast, soft handoff establishes a wireless link between the mobile station and the base station in the second cell while the wireless link between the mobile station and the base station in the first cell is maintained. In other words, soft handoff can be thought of as a handoff technique characterized by the fact that wireless links are established with two (or more than two) base stations at the same time. This technique is often used in CDMA schemes (see the specification of International Application Laid-Open No. WO91/07020).

FIG. 11 is a diagram showing the configuration of a mobile telecommunications system, and FIG. 12 is a diagram useful in describing the soft handoff procedure. The system shown in FIG. 11 includes a mobile station (MS) 1, base stations (A, B) 2, 3 which communicate wirelessly with the mobile station in cells 4, 5, respectively, and a base station controller (BSC) 6. When the mobile station 1 in cell 4 moves and approaches the side of base station B while communicating with the base station A, the strength of radio waves received from the base station B gradually increases. When the mobile station 1 arrives at the region where the cells 4 and 5 intersect and the electric field strength of the radio waves received from the base station B surpasses a set level, the mobile station 1 notifies the base station controller 6 of this fact via the base station 2. As a result, the base station controller 6 establishes a wireless link between the mobile station 1 and the base station B without severing the wireless link between the mobile station 1 and the base station A, and the mobile station 1 therefore communicates with the plurality of base stations A, B simultaneously. When the reception field strength between the mobile station 1 and the base station A falls below the set level and remains there for a predetermined period of time, the wireless link between them is severed and the mobile station 1 communicates with the base station B from this point onward.

When the strength of a pilot signal from the base station B exceeds a set level T-ADD in a CDMA scheme, the mobile station 1 sends a pilot strength measurement message to the base station controller BSC via the base station A (1a, 2a in FIG. 12). Upon receiving this message, the base station controller BSC judges whether handoff between the mobile station 1 and the base station B should be executed. If the base station controller BSC decides to execute handoff, then it instructs the base station B of a communication channel CH, etc., allocated to the mobile station 1. In response, the base station B starts the transmission of a channel designating message on a channel Forward T-CH (2b).

Next, the base station controller BSC transmits a handoff direction message to the mobile station 1 via the base stations A and B (2c). Upon receiving the handoff direction message, the mobile station 1 acquires the communication channel CH, on which transmission is taking place, from the base station B and thenceforth is capable of communicating with the base station B over this channel and sends a handoff completion message to the base station controller BSC via the base station A and B (1b, 2d).

The mobile station 1 thenceforth communicates with the base station A, B simultaneously. If the strength of the pilot signal from the base station A falls below the set level and remains there for a set period of time, the mobile station 1 transmits the pilot strength measurement message to the base station controller BSC via the base station A. In response to this notification, the base station controller BSC decides to terminate communication between the mobile station 1 and the base station A and transmits the handoff direction message to the mobile station 1 via the base stations A, B (1c, 2e).

Upon receiving the handoff direction message, the mobile station 1 transmits the handoff completion message to the base station controller BSC via the base stations A, B and severs the wireless link with the base station A (1d).

Upon receiving the handoff completion message via the base stations A, B, the base station controller BSC instructs the base station A to stop using Forward T-CH. The base station A responds by stopping transmission/reception on Forward T-CH (2f). From this point onward the mobile station 1 communicates with the base station B.

Soft handoff has the following two characterizing features:

(1) Hitless handoff is possible.

Unlike hard handoff, wireless links can be changed over without conversation being interrupted at the time of handoff.

(2) Inter-cell diversity is possible.

Wireless link quality within a cell usually is poor near the perimeter of the cell. However, enabling communication with a plurality of base stations simultaneously by soft handoff makes possible inter-cell diversity (namely communication in which the base station that is capable of communicating at the lowest power is selected for communication). This reduces susceptibility to the effects of shadowing and fading.

Feature (1) mentioned above generally is noted as being the advantage of soft handoff. In actuality, however, feature (2) is more important because it increases the number of channels that can be accommodated by a base station (i.e., the channel capacity of the base station), as evident from the analysis set forth in the literature [A. J. Viterbi and A. M. Viterbi, "Other-Cell Interference in Cellular Power-Controlled CDMA", IEEE Trans. on. Commun., Vol. 42, No. 2/3/4/(1994)]. Specifically, if soft handoff is not carried out in CDMA uplink (the wireless link from the mobile station to the base station), interference on other cells increases greatly and the number of wireless channels that can be used decreases significantly (i.e., subscriber capacity declines greatly). In order to assure CDMA uplink channel capacity, therefore, soft handoff is an essential technique. Since communication with soft handoff is performed upon selecting the base station that is capable of communicating at the lowest power, interference with other cells is reduced and the number of wireless channels (channel capacity) that can be used is increased.

FIGS. 13A, 13B are diagrams useful in describing the effect of raising uplink channel capacity by soft handoff, in which FIG. 13A shows a case where soft handoff is not carried out and FIG. 13B a case where soft handoff is carried out.

Consider the situation where soft handoff is not performed (FIG. 13A). If a great deal of shadowing is caused by a building BLD or some other structure between a mobile station MS1 and a base station BS1 in a cell CL1, the mobile station MS1 controls transmission power in such a manner that the incoming call level at the base station BS1 will take on a stipulated value. Transmission power of the mobile station MS1 rises as a result. When this takes place, interference (see the arrow indicated by the dashed line) with respect to a cell of interest (cell CL0) increases and a limitation is imposed upon the number of mobile stations accommodated by the cell.

Now consider the situation where soft handoff is carried out (FIG. 13B). Even if shadowing occurs between the mobile station MS1 and base station BS1 in cell CL1, it will suffice if the mobile station MS1 can communicate with the base station BS2 and, hence, the transmission power of the mobile station MS1 need not be very high. This reduces the interference on the cell of interest CL0 and no limitation is imposed upon the number of mobile stations that can be accommodated by the cell, unlike the case where soft handoff is not used.

If the principal purpose of soft handoff is to provide greater convenience in CDMA schemes, as in feature (1) mentioned above, there is some margin available in terms of selecting whether soft handoff is to be performed or not. In order to assure channel capacity in CDMA schemes, however, soft handoff is essential and there is no leeway in terms of selecting it. This means that soft handoff must be implemented as simply and as inexpensively as possible.

Control according to the prior art is simple. Specifically, the mobile station measures the strength of signal power from the base station and, when the received power is less than a certain threshold value, the mobile station judges that the distance between the mobile station and the base station has become too great and performs soft handoff accordingly. In effect, the mobile station when situated at the central portion of a cell at which it will not cause interference in other cells does not perform soft handoff; only when it is at the perimeter of the cell where it will interface with other cells does the mobile station carry out soft handoff. However, this conventional technique is not an optimum soft handoff allocation scheme which maximizes channel capacity. In particular, a problem which arises is that if the soft handoff rate is low, uplink channel capacity undergoes a marked decline. It should be noted that soft handoff rate h is given by the following equation:

$$h=(N_{CH}-M)/M \quad (1)$$

where $N_{CH}$ represents the number of channels physically possessed by the base station and M represents the number of mobile stations which a base station can accommodate. In other words, the soft handoff rate is the ratio of the number $(N_{CH}-M)$ of wireless channels allocated for soft handoff use to the number M of mobile stations.

SUMMARY OF THE INVENTION

Accordingly, an object of the present invention is to provide an optimum soft handoff control method that maximizes channel capacity and, more particularly, a soft handoff control method performed so as to maximize channel capacity in dependence upon the soft handoff rate of a base station.

Another object of the present invention is to provide a soft handoff control method performed in such a manner that a variation in channel capacity is reduced even if the soft handoff rate of a base station changes.

In accordance with the present invention, the foregoing objects are attained by providing a soft handoff control method in a CDMA mobile telecommunications system in which, when a mobile station is changed over from a wireless link with a certain base station to a wireless link with another base station, a changeover to a prescribed wireless link is performed after wireless links are established with a plurality of base stations simultaneously, comprising the steps of (1) entering a soft handoff rate of a base station and (2) controlling, on the basis of the soft handoff rate, a maximum number of soft handoff branches allocated to a mobile station residing in a cell that corresponds to the above-mentioned base station.

For example, it is so arranged that soft handoff control is carried out at the perimeter of a cell and reception field strength conforming to a boundary between the cell perimeter and the cell center is set. When the reception field strength of radio waves from another base station exceed the set level, soft handoff control is executed in accordance with the maximum number of soft handoff branches. This arrangement makes it possible to perform soft handoff control so as to maximize the channel capacity of the base station.

In accordance with the present invention, the foregoing objects are attained by providing a soft handoff control method in a CDMA mobile telecommunications system in which, when a mobile station is changed over from a wireless link with a certain base station to a wireless link with another base station, a changeover to a prescribed wireless link is performed after wireless links are established with a plurality of base stations simultaneously, comprising a step of controlling, on the basis of the position of the mobile station in a cell conforming to base station, a number of soft handoff branches allocated to the mobile station.

For example, the number of soft handoff branches allocated to the mobile station is decided based upon the position of the mobile station in a cell so as to obtain the maximum channel capacity and reduce a variation in the channel capacity with respect to the soft handoff rate. Soft handoff control is then performed in accordance with this number of soft handoff branches. More specifically, in order that the maximum channel capacity will be obtained and a variation in the channel capacity with respect to the soft handoff rate reduced, a cell is divided into a cell perimeter area, one or more cell intermediate areas and a cell center area, the number of soft handoff branches in each area is decided in advance and the number of soft handoff branches allocated to the mobile station is controlled based upon the area in which the mobile station is situated.

Other features and advantages of the present invention will be apparent from the following description taken in conjunction with the accompanying drawings.

BRIEF DESCRIPTION OF THE DRAWINGS

FIGS. 1A, 1B and 1C are diagrams useful in describing conditions for allotting numbers of soft handoff branches in regard to positions of a mobile station;

FIG. 5 is a table for describing simulation conditions;

FIG. 6 is a diagram showing the configuration of a mobile telecommunications system according to the present invention;

FIG. 8 is a processing flowchart of soft handoff control according to a second embodiment of the present invention;

FIG. 9 is a processing flowchart of soft handoff control according to a third embodiment of the present invention;

DESCRIPTION OF THE PREFERRED EMBODIMENTS

(A) Principle of the Present Invention

Figure 2A:
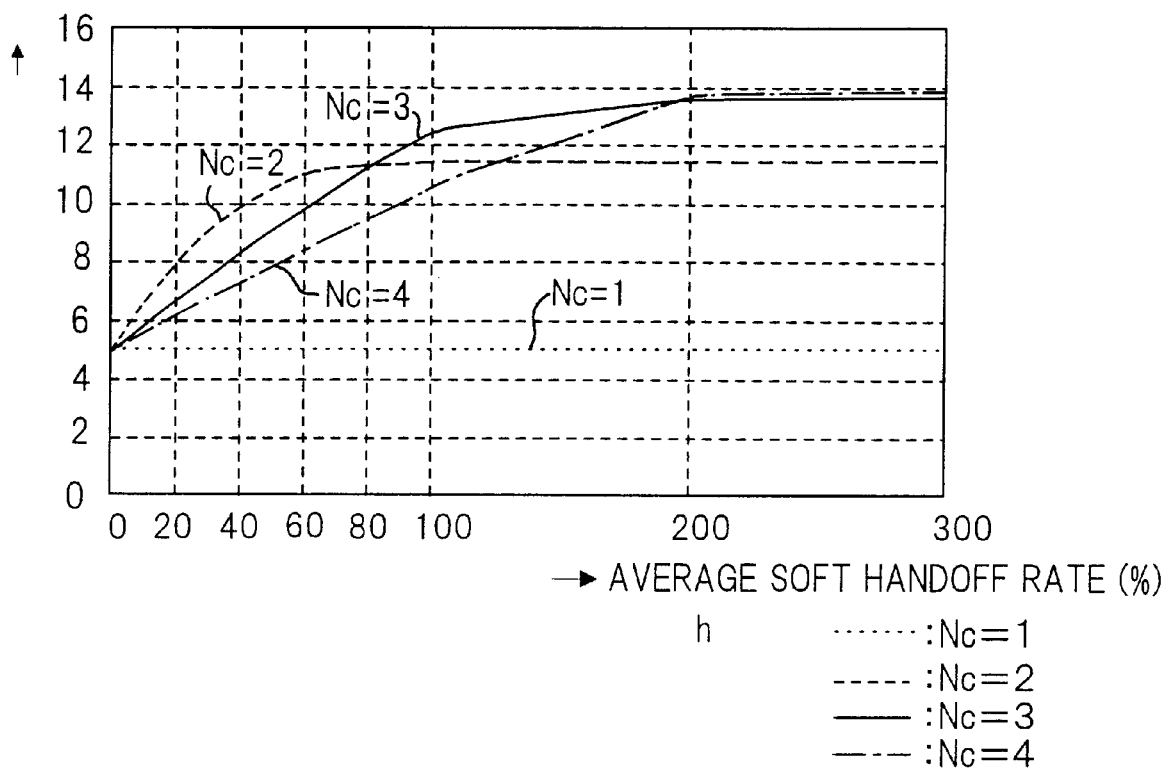
FIGS. 2A and 2B are diagrams (results of simulation) useful in describing the relationship between channel capacity and average soft handoff rate in case of a centralized arrangement (area ratio=1:0:0)
Figure 2B:
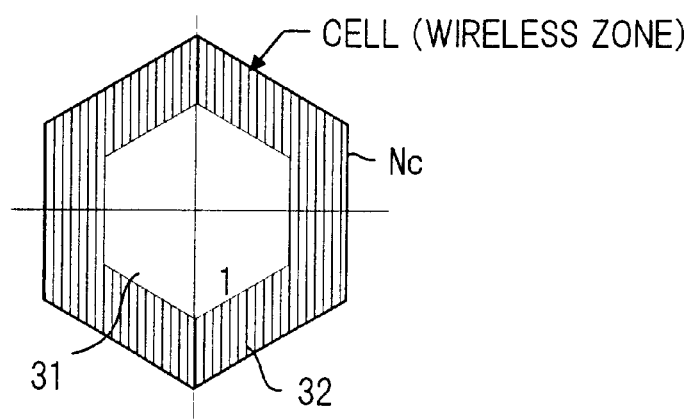

The present invention controls the number of soft handoff branches allocated to each mobile station in a cell in such a manner that channel capacity will be maximized with respect to any soft handoff rate. This minimizes a decline in channel capacity. The number of soft handoff branches is a value indicating the number of base stations to which a single mobile station has been connected by wireless links. If the number of soft handoff branches is equal to one, this means that the mobile station has been connected to only one base station. This is a state in which soft handoff is not in effect. In a case where the number of soft handoff branches differs depending upon the position of the mobile station, the maximum allowable number of soft handoff branches is adopted as the maximum number of soft handoff branches (which is represented by $N_c$).

FIGS. 1A, 1B and 1C are diagrams useful in describing conditions for arranging numbers of soft handoff branches in regard to positions of a mobile station in a cell (wireless zone).

The larger the number of soft handoff branches, the greater the effect of reducing interference by virtue of soft handoff and the greater the uplink channel capacity. It should be noted that the larger the number of soft handoff branches, the larger the number of codes used by the base station and, hence, the smaller the downlink channel capacity. For example, if the number of soft handoff branches of all mobile stations is equal to four, the number of codes (as well as the number of base station facilities and the required transmission power) necessary will be four times that of the mobile stations.

The larger the number of soft handoff branches, the smaller the interference inflected upon other cells. In the present invention, therefore, the number of soft handoff branches is large at the cell perimeter and is successively reduced as the center of the cell is approached. In other words, the invention proposes the three patterns depicted in FIGS. 1A through 1C as patterns for arranging the numbers of soft handoff branches in regard to the position of the mobile station.

FIG. 1A illustrates a case in which (1) a cell is divided into a cell center area 11, a cell perimeter area 14 and first-and second-intermediate areas 12, 13 lying between these two areas, and (2) the maximum number Nc of soft handoff branches is made equal to four and the numbers of soft handoff branches of the respective areas are made four, three, two and one in the order mentioned starting from the perimeter area of the cell. However, the maximum number Nc of soft handoff branches can be made equal to three and the numbers of soft handoff branches of the respective areas can be made three, two, one and one in the order mentioned starting from the perimeter area of the cell. Alternatively, the maximum number Nc of soft handoff branches can be made equal to two and the numbers of soft handoff branches of the respective areas can be made two, one, one and one in the order mentioned starting from the perimeter area of the cell.

FIG. 1B illustrates a case in which (1) a cell is divided into a cell center area 21, a cell perimeter area 23 and an intermediate area 22 lying between these two areas, and (2) the maximum number Nc of soft handoff branches is made equal to three and the numbers of soft handoff branches of the respective areas are made three, two and one in the order mentioned starting from the perimeter area of the cell. However, the maximum number Nc of soft handoff branches can be made equal to four and the numbers of soft handoff branches of the respective areas can be made four, three and one in the order mentioned starting from the perimeter area of the cell. Alternatively, the maximum number Nc of soft handoff branches can be made equal to two and the numbers of soft handoff branches of the respective areas can be made two, one, one and one in the order mentioned starting from the perimeter area of the cell.

FIG. 1C illustrates a case in which (1) a cell is divided into a cell center area 31 and a cell perimeter area 32, and (2) the maximum number Nc of soft handoff branches is made equal to three and the numbers of soft handoff branches of the perimeter and center areas are made two and one, respectively. However, the maximum number Nc of soft handoff branches can be made equal to four and the numbers of soft handoff branches of the perimeter and center areas can be made four and one, respectively. Alternatively, the maximum number Nc of soft handoff branches can be made equal to three and the numbers of soft handoff branches of the perimeter and center areas can be made three and one, respectively.

The areas of the areas 14, 13, 12 in FIG. 1A are represented by S4, S3, S2, respectively, then an area ratio (k) will be defined as follows:

$$\text{area ratio} = S4:S3:S2 = 1:k:k^2 \tag{2}$$

Further, the soft handoff rate h is defined as follows:

$$h = [(\text{total number } N_{CH} \text{ of TCH})/(\text{total number } M \text{ of mobile stations})] - 1 \tag{3}$$

and the total number $N_{CH}$ of TCH is defined as follows:

total number $N_{CH}$ of TCH=$\Sigma$ix (number of mobile stations performing i-branch soft handoff)  (4)

where i=1−Nc and Nc is the maximum number of the soft handoff branches.

FIGS. 2A, 2B through FIGS. 4A, 4B show results obtained by using computer simulation to determine how uplink channel capacity changes in accordance with soft handoff rate based upon the various methods of allotting numbers of soft handoff branches shown in FIGS. 1A through 1C. More specifically, these results where obtained by deciding the soft handoff rate h of a base station, computing the amount of interference inflicted upon another cell at this time and simulating, based upon the amount of interference, the number of channels capable of being accommodated by the base station. The simulation conditions are shown in FIG. 5. These conditions are as follows:

(1) The soft handoff rate h is 0 to 300%.
(2) The area ratios are 1:0:0 (k=0), 1:1:1 (k=1), 1:2:4 (k=2).
(3) The maximum numbers Nc of soft handoff branches are 4, 3, 2, 1.
(4) The transmission conditions are as follows:
   distance attenuation index: $\alpha$=3.5
   standard deviation of shadowing fluctuation: $\sigma_{STM}$=8 db
   shadowing correlation: $\rho$=0.5
   standard deviation of TPC fluctuation: $\rho$TPC=1.5 db
   Eb/No threshold value: Eb/No−th=5 db FIG. 2A illustrates the results of computer simulation in a case where the area ratio is 1:0:0 (k=0), i.e., in the case of the centralized arrangement of FIG. 2B. Here maximum number Nc of handoff branches in the cell perimeter area 32 was made 4, 3, 2 and 1. It should be appreciated from the results of this computer simulation that (1) channel capacity is maximized when Nc=2 holds in case of h<80%; (2) channel capacity is maximized when Nc=3 holds in case of 200%>h>80%; and (3) channel capacity is maximized when Nc=4 holds in case of h>200%. Since channel capacity at Nc=4 is not that different from channel capacity at Nc=3 when h>200% holds, in this case Nc=3 is advantageous in terms of the cost of base station facilities.

Figure 3A:
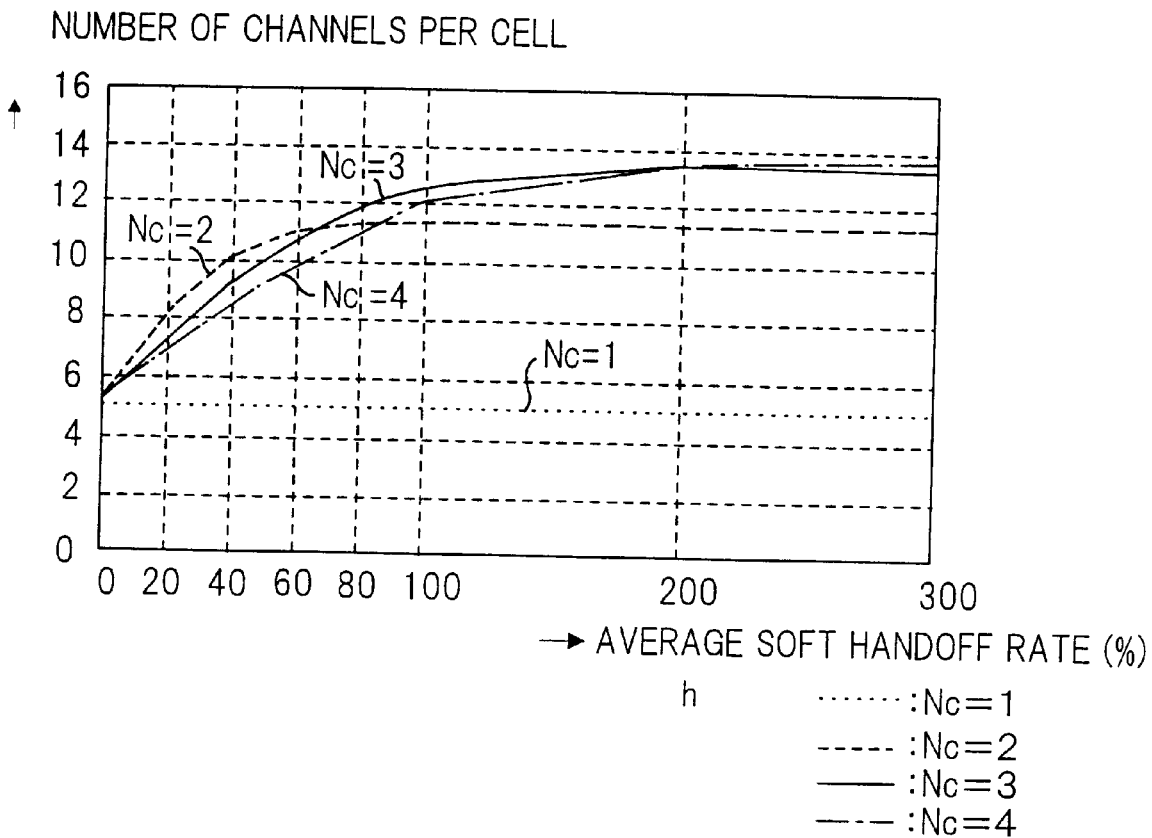
FIGS. 3A and 3B are diagrams (results of simulation) useful in describing the relationship between channel capacity and average soft handoff rate in case of an area ratio of 1:1:1.
Figure 3B:
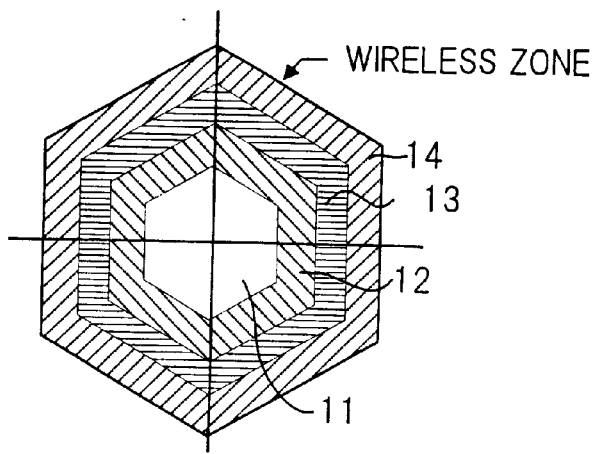

FIG. 3A illustrates the results of computer simulation in a case where the area ratio is 1:1:1 (k=1) (see FIG. 3B). Here maximum number Nc of handoff branches in the cell perimeter area 14 was made 4, 3, 2 and 1. It should be understood from the results of this computer simulation that (1) channel capacity is maximized when Nc=2 holds in case of h<60%; (2) channel capacity is maximized when Nc=3 holds in case of 60%<h<180%; and (3) channel capacity is maximized when Nc=4 holds in case of 180°<h. However, the maximum channel capacity is not that different from the channel capacity at Nc=3 over the entire range of soft handoff rate h. In addition, channel capacity at Nc=3 is substantially constant over the range 80%<h<300%. In other words, in case of the area ratio 1:1:1 (k=1), channel capacity can be essentially maximized and fluctuation in channel capacity with respect to the soft handoff rate h can be reduced by adopting the Nc=3, regardless of the handoff rate of the base station.

Figure 4A:
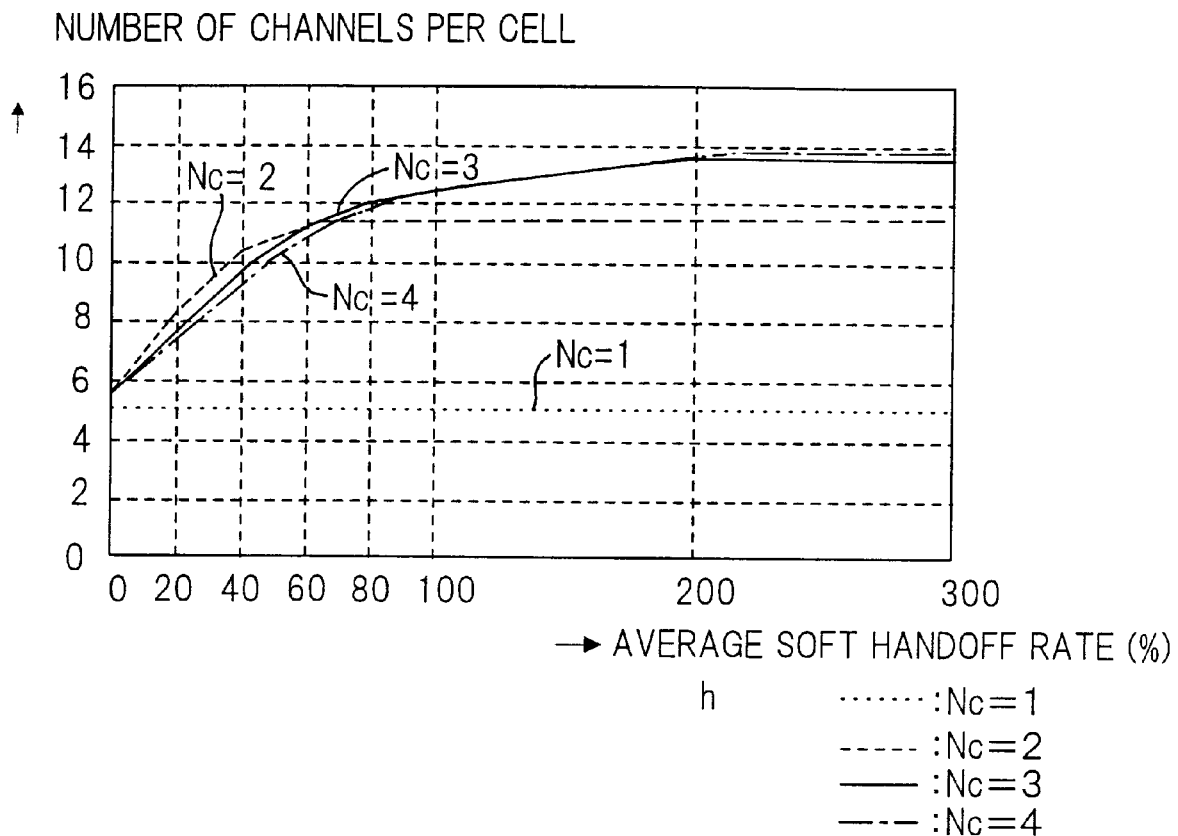
FIGS. 4A and 4B are diagrams (results of simulation) useful in describing the relationship between channel capacity and average soft handoff rate in case of an area ratio of 1:2:4.
Figure 4B:
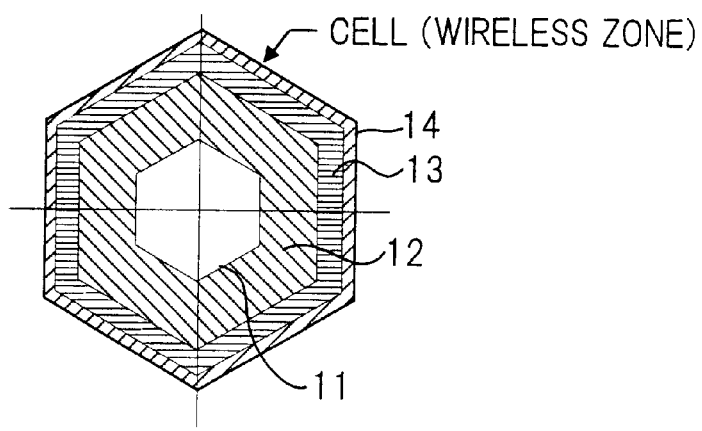

FIG. 4A illustrates the results of computer simulation in a case where the area ratio is 1:2:4 (k=2 (see FIG. 4B). Here maximum number Nc of handoff branches in the cell perimeter area 14 was made 4, 3, 2 and 1. The results of the simulation of FIG. 4A indicate a tendency substantially the same as the results of simulation of FIG. 3A. The maximum channel capacity is almost no different from the channel capacity at Nc=3 over the entire range of soft handoff rate h. Moreover, fluctuation in channel capacity can be reduced with respect to the soft handoff rate h.

Thus, the maximum channel capacity of a CDMA scheme can be obtained by selecting the method of allocating the number of soft handoff branches so as to maximize channel capacity for a soft handoff rate h decided based upon the number of codes that, can be used by the base station, the number of wireless facilities and the required transmission power. For example, if h<80% holds in the centralized arrangement (FIG. 2A) where the area ratio is 1:0:0 (k=0), the maximum number Nc of soft handoff branches is made two; if 300%>h>80% holds, then Nc=3 is adopted. Further, in a case where the area ratio is 1:1:1 or 1:2:4 (FIG. 3A or FIG. 4A), adopting Nc=3 makes it possible to substantially maximize channel capacity and to reduce any fluctuation in channel capacity with respect to soft handoff rate.

(B) Embodiments

(a) Construction

FIG. 6 is a diagram showing the configuration of a mobile telecommunications system according to the present invention. The system includes a mobile station (MS) 51, base stations 52, 53 which communicate wirelessly with the mobile station in cells (wireless zones) 54, 55, respectively, a base station controller (BSC) 56, and a system parameter setting unit 57. The system parameter setting unit 57 sets various system parameters in the base station controller 56. Examples of the parameters are the number of soft handoff branches in each area of a cell and the boundary reception field strength of each area.

Using (1) the area ratio 1:k:$k^2$ and (2) the average soft handoff rate h (decided based upon the number of codes that can be used by a base station, the number of wireless facilities and the transmission power), the system parameter setting unit 57 obtains the number of soft handoff branches of each area and sets these in the base station controller 56, obtains the boundary reception field strength of each area and sets these in the base station controller 56. When the mobile station 51 in cell 54 moves and approaches the base station 53 while communicating with the base station 52 under these conditions, the strength (received electric field strength) of a pilot signal from the base station 53 gradually increases. When the mobile station 51 penetrates a soft handoff area, the mobile station 51 reports this (sends a soft handoff request) to the base station controller 56 via the base station 52. As a result, the base station controller 56 performs soft handoff control in accordance with the set system parameter from the system parameter setting unit 57.

(b) First Embodiment

Figure 7:
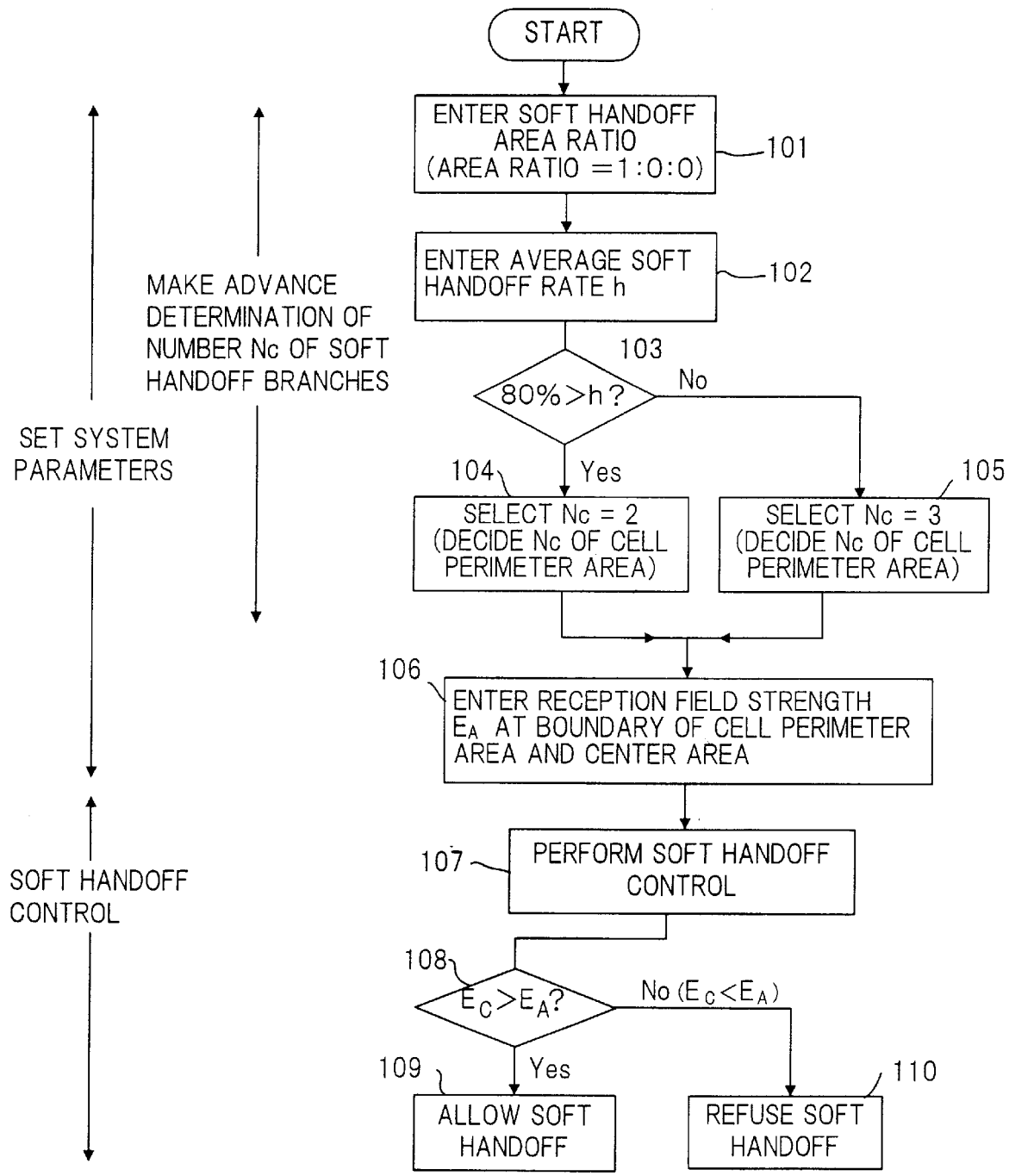
FIG. 7 is a processing flowchart of soft handoff control according to a first embodiment of the present invention.

FIG. 7 is a processing flowchart of soft handoff control according to a first embodiment of the invention. This is for a case where the area ratio is 1:0:0 (see FIG. 2B). In the case of the centralized arrangement in which the area ratio is 1:0:0, it is possible to decide a number of soft handoff branches that will maximize channel capacity with respect to the soft handoff rate h. For example, in FIG. 2A, channel capacity is maximized when Nc=2 holds at a soft handoff rate h of less than 80% and when Nc=3 holds at a soft handoff rate h of 80~300%. Accordingly, if the area ratio is 1:0:0, then the number of soft handoff branches is decided and soft handoff executed as follows:

First, the area ratio is entered. In the first embodiment, 1:0:0 is entered as the area ratio (step 101). Next, the average handoff rate h, which is decided based the number of codes usable by the base station, the number of wireless facilities and the transmission power, is entered (step 102). Herein, $N_{CH}$ in the equations (1) and (3) is equal to the number of codes and M in the equations (1) and (3) is determined by the number of wireless facilities and the transmission power. When the area ratio 1:0:0 and average handoff rate h have been entered, the system parameter setting unit 57 checks to determine whether the relation 80%>h holds (step 103).

If 80%>h holds, the maximum number Nc of soft handoff branches of the cell perimeter area 32 (see FIG. 2B) is made two (step 104). If 80%<h holds, then the maximum number Nc of soft handoff branches of the cell perimeter area 32 (see FIG. 2B) is made three (step 105). This ends processing for advance determination of the number Nc of soft handoff branches. If reception field strength $E_A$ at the boundary of the cell perimeter area 32 and cell center area 31 is entered (step 106), this completes the setting of the system parameters for soft handoff control and soft handoff control becomes possible (step 107). A method of deciding the boundary will be described later.

When the mobile station 51 in cell 54 (FIG. 6) moves and approaches the base station 53 while communicating with the base station 52 under these conditions, the strength (received electric field strength $E_C$) of received radio waves (the pilot signal) from the base station 53 gradually increases. The mobile station 51 determines whether the relation $E_C>E_A$ holds (step 108). If the answer is "YES" at step 108, then the mobile station 51 reports this to the base station controller 56 via the base station 52. As a result, the base station controller 56 performs soft handoff control (step 109) in accordance with the system parameter (Nc=2 or 3) already set. If $E_C<E_A$ holds, however, then the mobile station 51 does not request soft handoff and, even if it does, the base station controller 56 refuses the request (step 110).

Thus, the number of soft handoff branches can be decided based upon the soft handoff rate so as to maximize the channel capacity. This makes it possible to minimize a deterioration in channel capacity even if the soft handoff rate is limited.

A case has been described in which the number of soft handoff branches is decided based upon the characteristic shown in FIG. 2A, which illustrates the centralized arrangement. However, it is also possible to decide the optimum number of soft handoff branches based upon the characteristics of FIGS. 3A and 4A, which are not centralized arrangements, though the effects will not be as great as with the centralized arrangement.

(c) Second Embodiment

FIG. 8 is a processing flowchart of soft handoff control according to a second embodiment of the invention. This is for a case where the area ratio is 1:1:1 (see FIG. 3B). If the relation Nc=3 is adopted based upon the characteristic of FIG. 3A irrespective of the average handoff rate h in the case where the area ratio is 1:1:1, the channel capacity can be substantially maximized and fluctuation of channel capacity with respect to the soft handoff rate can be reduced.

Accordingly, when the area ratio 1:1:1 is entered (step 201), the system parameter setting unit 57 makes the maximum number Nc of soft handoff branches equal to three (step 202). That is, the number Nc of soft handoff branches of the cell perimeter area 14 (see FIG. 3B) is made three, the number Nc of soft handoff branches of the first intermediate area 13 (see FIG. 3B) is made two, and the number Nc of soft handoff branches of the second intermediate area 12 (see FIG. 3B) is made one (i.e., soft handoff is not performed).

This is followed by entering the reception field strengths $E_A, E_B$ ($E_A>E_B$) at the boundary of the cell perimeter area 14 and first intermediate area 13 and at the boundary of the first intermediate area 13 and second intermediate area 12 (step 203). If the setting of the system parameters for soft handoff control is completed by the foregoing operation, then soft handoff control becomes possible (step 204).

When the mobile station 51 in cell 54 (FIG. 6) moves and approaches the base station 53 while communicating with the base station 52 under these conditions, the strength (received electric field strength $E_C$) of the pilot signal from the base station 53 gradually increases. The mobile station 51 determines whether the relation $E_C>E_B$ holds (step 205). If the answer is "YES" at step 205, then the mobile station 51 sends a soft handoff request (inclusive of the received electric field strength $E_C$) to the base station controller 56 via the base station 52. As a result, the base station controller 56 determines whether the relation $E_C>E_A$ holds (step 206). If the answer is "YES", then soft handoff control is performed using three as the number of soft handoff branches (step S207). If the relation $E_A>E_C>E_B$ holds, soft handoff control is performed using two as the number of soft handoff branches (step S208). If $E_C<E_B$ holds, the mobile station 51 does not request soft handoff and, even if it does, the base station controller 56 refuses the request (step 209).

According to the second embodiment, the number of soft handoff branches is large at the cell perimeter and is successively reduced as the center of the cell is approached, as illustrated in FIG. 3B. Adopting this arrangement makes it possible to reduce a decline in channel capacity with respect to a change in soft handoff rate. In other words, the second embodiment decides the optimum number of soft handoff branches depending upon the position of the mobile station. As a result, a decline in channel capacity can be minimized even if there is a change in soft handoff rate owing to a change in number of mobile stations or a change in number of base station facilities. Further, according to the second embodiment, numbers of soft handoff branches are allocated in such a manner that the change becomes as seamless as possible from the cell perimeter to the cell center. This makes it possible to reduce even further a change in channel capacity when the soft handoff rate changes.

(d) Third Embodiment

FIG. 9 is a processing flowchart of soft handoff control according to a third embodiment of the invention. This is for a case where the area ratio is 1:2:4 (see FIG. 4B). If the relation Nc=3 is adopted based upon the characteristic of FIG. 3A irrespective of the average handoff rate h in the case where the area ratio is 1:2:4, the channel capacity can be substantially maximized and fluctuation of channel capacity with respect to the soft handoff rate can be reduced.

Accordingly, when the area ratio 1:2:4 is entered (step 301), the system parameter setting unit 57 makes the maximum number Nc of soft handoff branches equal to three (step 302). That is, the number Nc of soft handoff branches of the cell perimeter area 14 (see FIG. 4B) is made three, the number Nc of soft handoff branches of the first intermediate area 13 is made two, and the number Nc of soft handoff branches of the second intermediate area 12 is made one (i.e., soft handoff is not performed).

This is followed by entering the reception field strengths $E_A, E_B$ ($E_A>E_B$) at the boundary of the cell perimeter area 14 and first intermediate area 13 and at the boundary of the first intermediate area 13 and second intermediate area 12 (step 303). If the setting of the system parameters for soft handoff control is completed by the foregoing operation, then soft handoff control becomes possible (step 304).

When the mobile station 51 in cell 54 (FIG. 6) moves and approaches the base station 53 while communicating with the base station 52 under these conditions, the strength (received electric field strength $E_C$) of the pilot signal from the base station 53 gradually increases. The mobile station 51 determines whether the relation $E_C > E_B$ holds (step 305). If the answer is "YES" at step 305, then the mobile station 51 sends a soft handoff request (inclusive of the received electric field strength $E_C$) to the base station controller 56 via the base station 52. As a result, the base station controller 56 determines whether the relation $E_C > E_A$ holds (step 306). If the answer is "YES", then soft handoff control is performed using three as the number of soft handoff branches (step S307). If the relation $E_A > E_C > E_B$ holds, soft handoff control is performed using two as the number of soft handoff branches (step S308). If $E_C < E_B$ holds, the mobile station 51 does not request soft handoff and, even if it does, the base station controller 56 refuses the request (step 309).

As in the second embodiment, the third embodiment is such that the number of soft handoff branches is large at the cell perimeter and is successively reduced as the center of the cell is approached, as illustrated in FIG. 4B. Adopting this arrangement makes it possible to reduce a decline in channel capacity with respect to a change in soft handoff rate. In other words, the third embodiment decides the optimum number of soft handoff branches depending upon the position of the mobile station. As a result, a decline in channel capacity can be minimized even if there is a change in soft handoff rate owing to a change in number of mobile stations or a change in number of base station facilities. Further, according to the third embodiment, numbers of soft handoff branches are allocated in such a manner that the change becomes as seamless as possible from the cell perimeter to the cell center. This makes it possible to reduce even further a change in channel capacity when the soft handoff rate changes.

In the case of FIGS. 2A, 2B through FIGS. 3A, 3B, if the soft handoff rate becomes small when the maximum number Nc of soft handoff branches is equal to four, channel capacity declines in comparison with channel capacity at Nc=2 and Nc=3. In the case of the area ratio of 1:2:4 of FIGS. 4A and 4B, there is not that much decline in channel capacity in comparison with channel capacity at Nc=2 and Nc=3 even if the soft handoff rate changes. That is, by allocating the soft handoff numbers gradually as in the manner of the area ratio of 1:2:4, for example, the third embodiment can provide greater effects that the second embodiment. As a result, it is possible to enhance the effect of raising channel capacity when there is a change in soft handoff rate owing to a change in number of mobile stations or a change in the number of base station facilities.

(C) Method of Deciding Boundaries

Figure 10A:
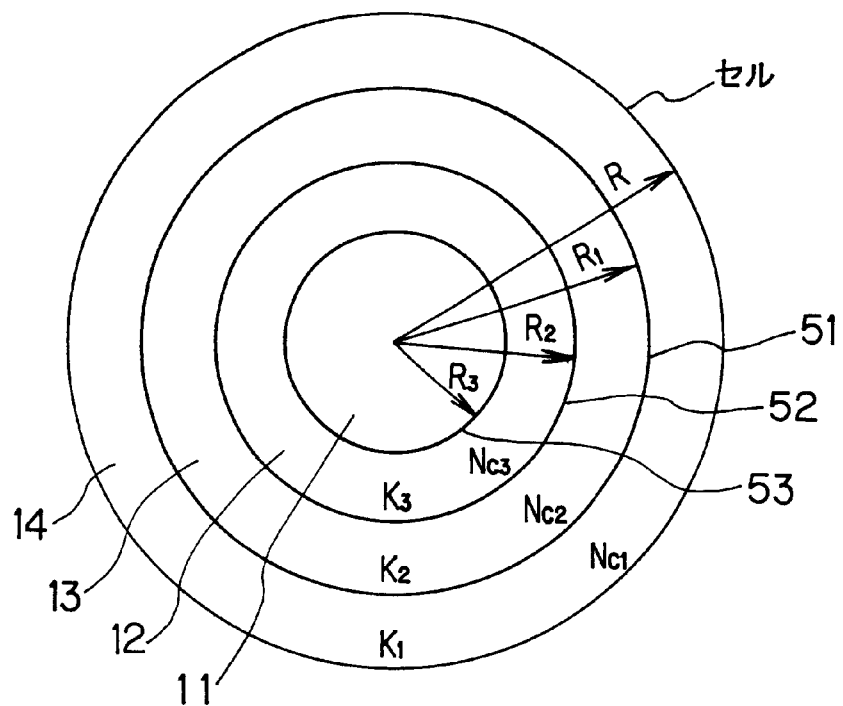
FIGS. 10A, 10B and 10C are diagrams useful in describing a method of deciding area boundaries.

FIG. 10A is a diagram useful in describing the boundaries of areas in a case where a cell has the shape of a circle of radius R. The boundary between the cell perimeter area 14 and the first intermediate area 13 is shown at 51, the boundary between the first intermediate area 13 and the second intermediate area 12 at 52 and the boundary between the second intermediate area 12 and the cell center area 11 at 53.

Radii $R_1$, $R_2$, $R_3$ of the respective boundaries 51, 52, 53 are found, where $N_{c1}$, $N_{c2}$, $N_{c3}$ (the number Nc of soft handoff branches of cell center area 11 is one) represent the numbers of soft handoff branches of the areas 14, 13, 12, respectively, the area ratio is $1:K_2:K_3$ ($K_1=1$) and h represents the average soft handoff rate.

A number Nr of terminals within a cell and a number Nrc of wireless channels are given by the following equations, where $\eta$ represents the density of the currently communicating terminals (the density of currently communicating mobile stations):

$$Nrs = \pi R^2 \cdot \eta \, Nrc = \pi(R^2-R_1^2)\cdot\eta\cdot Nc_1 + \pi(R_1^2-R_2^2)\cdot\eta\cdot Nc_2 + \pi(R_2^2-R_3^2)\cdot\eta\cdot Nc_3 + \pi R_3^2 \cdot \eta$$

$$= \pi\eta\{R^2 Nc_1 - R_1^2(Nc_1-Nc_2) - R_2^2(Nc_2-Nc_3) - R_3^2(Nc_3-1)\}$$

Since the area ratio is $1:K_2:K_3$, we have $$K_2(R^2-R_1^2) = (R_1^2-R_2^2) \therefore R_2^2 = (1+K_2)R_1^2 - K_2 R^2 \qquad (1)$$

$$K_3(R^2-R_1^2) = (R_2^2-R_3^2)$$

$$\therefore R_3^2 = R_2^2 + K_3 R_1^2 - K_3 R^2 = (1+K_2)R_1^2 - K_2 R^2 + K_3 R_1^2 - K_3 R^2$$

$$= (1+K_2+K_3)R_1^2 - (K_2+K_3)R^2 \qquad (2)$$

Substituting this into the equation of Nrc gives us the following:

$$Nrc = \pi\eta\{R^2 Nc_1 - R_1^2(Nc_1-Nc_2) - [(1+K_2)R_1^2 - K_2 R^2](Nc_2-Nc_3) - [(1+K_2+K_3)R_1^2 - (K_2+K_3)R^2](Nc_3-1)\}$$

$$= \pi\eta\{R^2[Nc_1+K_2 Nc_2+K_3 Nc_3-(K_2+K_3)] - R_1^2[Nc_1+K_2 Nc_2+K_3 Nc_3-(1+K_2+K_3)]\}$$

From the definition of the soft handoff rate h, we have $$h = (Nrc-Nrs)/Nrs$$

When Nrc, Nrs are inserted into the above equation, therefore, we have $$h = \{R^2[Nc_1+K_2 Nc_2+K_3 Nc_3-(K_2+K_3)] - R_1^2[Nc_1+K_2 Nc_2+K_3 Nc_3-(1+K_2+K_3)] - R^2\}/R^2$$

and the following equation is established:

$$(R_1^2/R^2)\cdot[Nc_1+K_2 Nc_2+K_3 Nc_3-(1+K_2+K_3)] = Nc_1+K_2 Nc_2+K_3 Nc_3-(1+K_2+K_3)-h$$

Therefore, we have $$(R_1^2/R^2) = [Nc_1+K_2 Nc_2+K_3 Nc_3-(1+K_2+K_3)-h]/[Nc_1+K_2 Nc_2+K_3 Nc_3-(1+K_2+K_3)]$$

and $R_1$ is found. Further, by inserting the above equation into Equations (1), (2), we find $R_2$ and $R_3$. That is, we have the following:

$$R_1 = R\{[Nc_1+K_2\cdot Nc_2+K_3\cdot Nc_3-(1+K_2+K_3)-h]/[Nc_1+K_2\cdot Nc_2+K_3\cdot Nc_3-(1+K_2+K_3)]\}^{1/2}$$

$$R_2 = R\{[Nc_1+K_2\cdot Nc_2+K_3\cdot Nc_3-(1+K_2+K_3)-(1+K_2)\cdot h]/[Nc_1+K_2\cdot Nc_2+K_3\cdot Nc_3-(1+K_2+K_3)]\}^{1/2}$$

$$R_3 = R\{[Nc_1+K_2\cdot Nc_2+K_3\cdot Nc_3-(1+K_2+K_3)-(1+K_2+K_3)\cdot h]/[Nc_1+K_2\cdot Nc_2+K_3\cdot Nc_3-(1+K_2+K_3)]\}^{1/2}$$

Figure 10B:
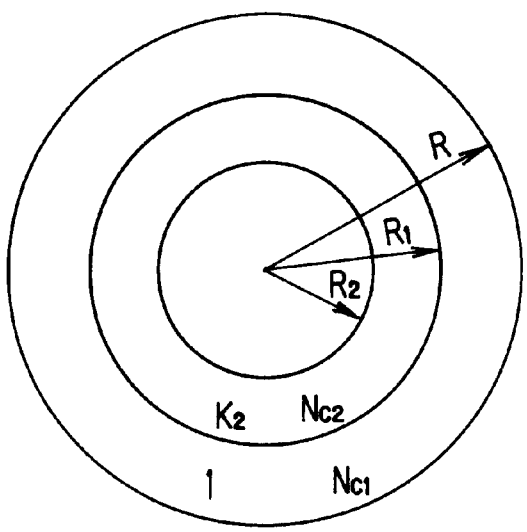
Figure 10C:
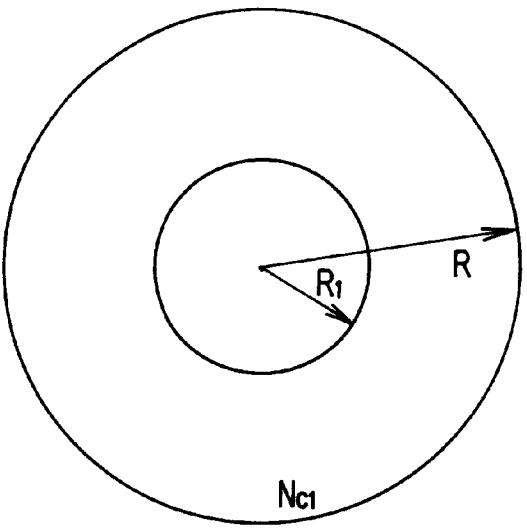
Figure 11:
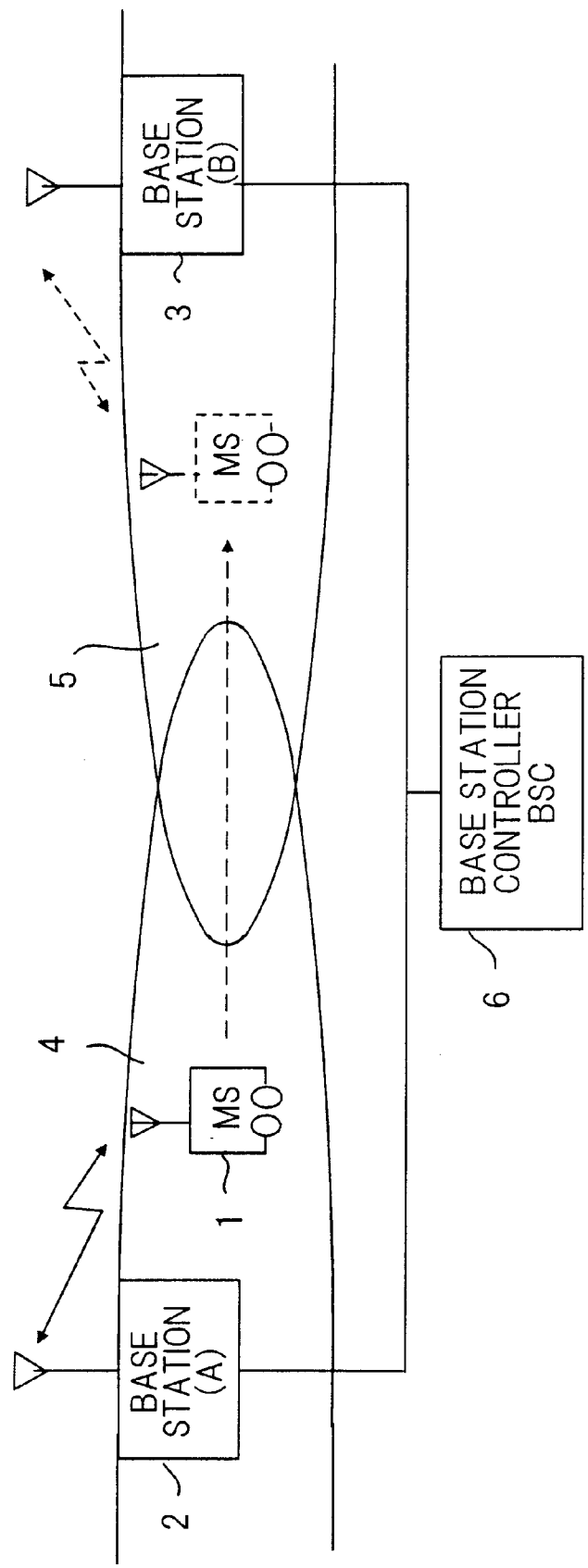
FIG. 11 is a diagram showing the configuration of a mobile telecommunications system according to the prior art.
Figure 12:
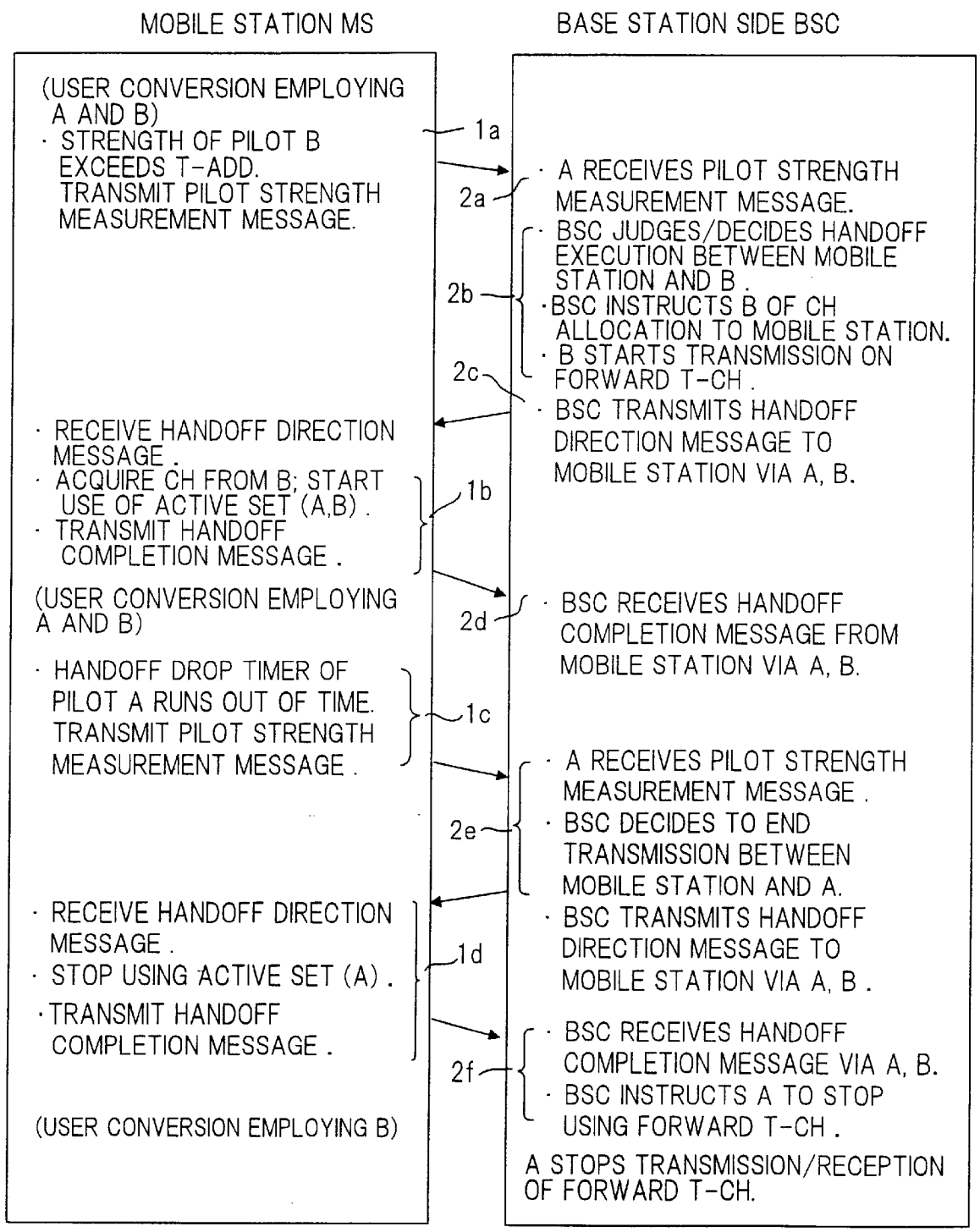
FIG. 12 is a diagram for describing a soft handoff control procedure.
Figure 13A:
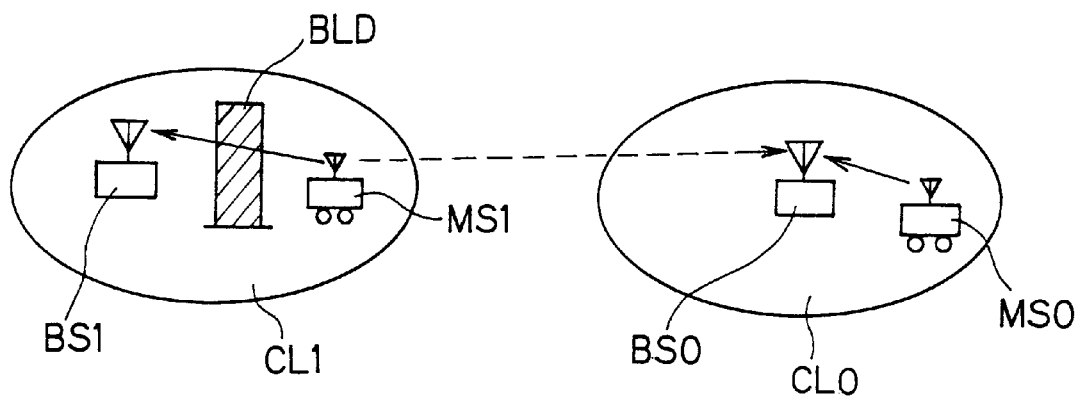
FIGS. 13A and 13B are diagrams useful in describing the effect of raising uplink channel capacity by soft handoff.
Figure 13B:
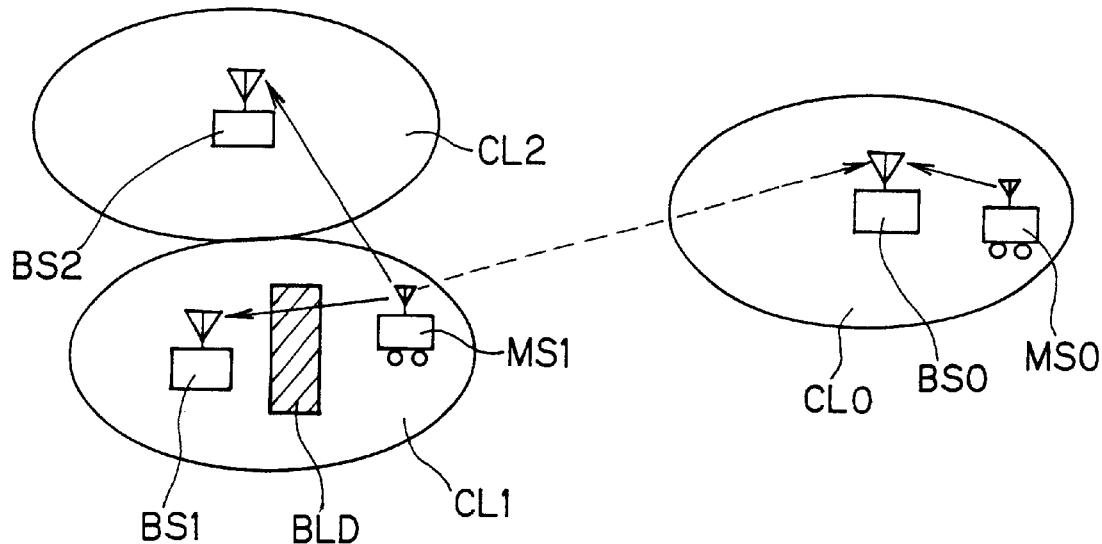

If $K_3=0$ holds in the above equations, then it is possible to obtain the boundaries in the pattern showing the arrangement of the numbers of soft handoff branches in FIG. 10B. If $K_2=K_3=0$ holds in the above equations, then it is possible to obtain the boundary in the pattern showing the arrangement of the number of soft handoff branches in FIG. 10C.

Thus, in accordance with the present invention, the soft handoff rate of a base station is entered and the maximum number of soft handoff branches allocated to a mobile station residing in a cell that corresponds to the above-mentioned base station is controlled based upon the soft handoff rate. As a result, soft handoff can be controlled so as to maximize the channel capacity of the base station. In addition, since the number of soft handoff branches is decided based upon the soft handoff rate so as to maximize channel capacity, it is possible to minimize a decline in channel capacity even if the soft handoff rate is limited.

In accordance with the present invention, the number of soft handoff branches is made large at the perimeter of a cell and is successively reduced as the center of the cell is approached. That is, the optimum number of soft handoff branches is decided depending upon the position of the mobile station. As a result, a decline in channel capacity can be minimized even if there is a change in soft handoff rate owing to a change in number of mobile stations or a change in number of base station facilities.

In accordance with the present invention, the number of soft handoff branches allocated to a mobile station is controlled based upon the position of this mobile station within a cell, and numbers of soft handoff branches are allocated in such a manner that the change becomes as seamless as possible from the cell perimeter to the cell center. As a result, it is possible to enhance the effect of raising channel capacity when there is a change in soft handoff rate owing to a change in number of mobile stations or a change in the number of base station facilities.

As many apparently widely different embodiments of the present invention can be made without departing from the spirit and scope thereof, it is to be understood that the invention is not limited to the specific embodiments thereof except as defined in the appended claims.

What is claimed is:

1. A soft handoff control method by a base station controller in a CDMA mobile telecommunications system in which, when a mobile station is handed off to a wireless link with another base station, handoff to a prescribed wireless link is performed after wireless links are established between the mobile station and a plurality of base stations simultaneously, comprising the steps;

dividing a cell into a cell perimeter area, one or more cell intermediate areas and a cell center area and inputting an area ratio to the base station controller;

setting some levels of reception electric field strength that are used for deciding the mobile station exists in which area so that the base station controller performs soft handoff control at the cell perimeter and the cell intermediate areas;

deciding a number of soft handoff branches in each area based upon said area ratio;

receiving from the mobile station, a reception electric field strength of radio waves from said another base station;

discriminating an area in which the mobile station is situated by comparing the received reception electric field strength and the set levels;

determining, based upon the discriminated area, the number of soft handoff branches allocated to said mobile station; and performing soft handoff control based upon the number of soft handoff branches.

2. The method according to claim 1, wherein the numbers of soft handoff branches are allocated to the mobile station based upon the area in which the mobile station is situated in such manner that the numbers of soft handoff branches change gradually from the peripheral portion of the cell to the central portion of the cell.

* * * * *